April 14, 1970    D. L. HANAUER ET AL    3,505,740
MEASURING DEVICE FOR DETERMINING THE RADIAL DISPOSITION
OF A KEYWAY IN A SHAFT
Filed Jan. 4, 1968
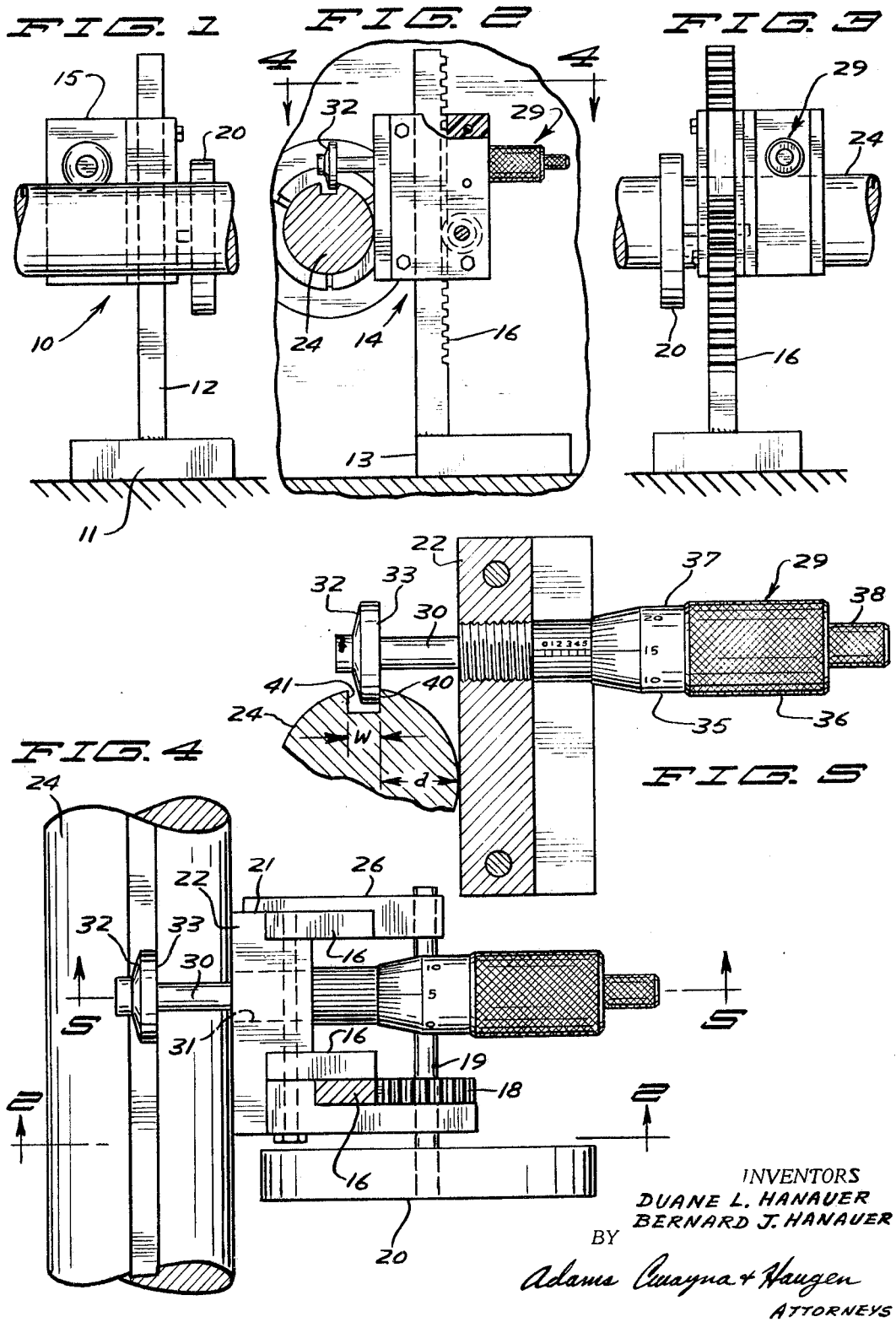
INVENTORS
DUANE L. HANAUER
BERNARD J. HANAUER
BY
Adams Cwayna + Haugen
ATTORNEYS United States Patent Office 3,505,740
Patented Apr. 14, 1970

3,505,740
MEASURING DEVICE FOR DETERMINING THE RADIAL DISPOSITION OF A KEYWAY IN A SHAFT
Duane L. Hanauer and Bernard J. Hanauer, Avon, Minn., assignors to Hanauer Machine Works, Inc., Avon, Minn., a corporation of Minnesota
Filed Jan. 4, 1968, Ser. No. 695,608
Int. Cl. G01b 5/00
U.S. Cl. 33—143                                         5 Claims

ABSTRACT OF THE DISCLOSURE

A measuring device for determining the radial disposition of a generally planar surface located in radially or arcuately spaced relationship to a generally cylindrical surface. The apparatus is adapted for determining the radial disposition of a generally planar surface such as a keyway in a generally cylindrical shaft, and includes a base plate having a support column member disposed at right angles to the base plate having measuring means mounted thereon. The measuring means are adapted for reciprocatory up-and-down motion relative to the base plate, and include an abutment plate for meeting the cylindrical surface of the member being studied. Means including an extensible member arranged for relative motion with the abutment plate are also provided. A scale mechanism, particularly a micrometer mechanism, is provided for determining the relative spacing between the outer surface of the abutment plate and the inner contacting surface of the extensible member.

---

The present invention relates generally to an improved measuring instrument, and more specifically to a measuring instrument which is particularly adapted for use in determining the disposition of a recessed slot, such as a keyway, in a generally cylindrical shaft. This apparatus may be utilized in both set-up and quality control efforts involving operations wherein generally rectangular slots are formed in or on cylindrical shaft surfaces. The apparatus is also adaptable for use in determining the disposition of a planar surface located radially outwardly from the generally cylindrical surface of the shaft being studied.

In the past, various techniques have been employed to determine the position and proper location of a channel, slot, keyway, or the like, formed along the surface of a generally cylindrical shaft. Each of these techniques involves rather complex equipment, and have generally been cumbersome and difficult to work with. These apparatus are generally adapted for use in either set-up work or quality control work, however a combined instrument of this type has not heretofore been generally available.

The apparatus of the present invention includes a measuring instrument with a base plate having a support column disposed at right angles thereto. A measuring means is adapted to move reciprocatorily up and down along the support column and relative to said base plate. The measuring means includes an abutment plate which is adapted to make contact with the outer cylindrical surface of the part being studied, and also includes an extensible member which is adapted to move relative to the abutment plate. Scale means are provided for determining the relative spacing between the outer surface of the abutment plate and the inner surface of the extensible member. In this fashion, a variety of sizes of shafts may be studied, and the apparatus is sufficiently versatile to accommodate shafts in virtually any disposition, thereby rendering the instrument applicable for both set-up and quality control efforts.

Therefore, it is an object of the present invention to provide an improved measuring instrument which is particularly adapted for determining the disposition of channels, slots, keyways, or the like disposed in and along the surfaces of generally cylindrical shaft members.

It is yet a further object of the present invention to provide an improved measuring instrument for determining the disposition of a keyway slot arranged in a shaft, the instrument being versatile and adapted to accommodate a variety of shaft sizes in a variety of predetermined dispositions.

Other and further objects of the present invention will become apparent to those skilled in the art upon a review of the following specification, appended claims, and accompanying drawing, wherein:

FIGURE 1 is a front elevational view of a measuring instrument prepared in accordance with the present invention;

FIGURE 2 is a side elevational view, partially broken away, of the apparatus shown in FIGURE 1;

FIGURE 3 is a rear elevational view of the apparatus shown in FIGURE 1;

FIGURE 4 is a horizontal sectional view taken along the line and in the direction of the arrows 4—4 of FIGURE 2; and FIGURE 5 is a vertical sectional view taken along the line and in the direction of the arrows 5—5 of FIGURE 4, FIGURE 5 illustrating the shaft being studied in partially broken away form.

In accordance with the preferred modification of the present invention, the measuring apparatus generally designated 10 includes a base plate 11 having a support column 12 arranged in right angle relationship thereto. The support column 12 joins the base plate 11 at a point adjacent the front surface 13 of the base plate 11, thus enhancing the versatility of the device and permitting a wider or more universal application in a variety of attitudes and dispositions including both vertical and horizontal dispositions. Secured to the support column 12 is the measuring means generally designated 14, this measuring means including a carrier frame member 15 which is adapted for reciprocatory up-and-down motion relative to the base plate 11. In order to accomplish this reciprocatory up-and-down motion, a rack and pinion arrangement is provided wherein a rack 16 is secured along one surface of the support column 12, and is adapted to be engaged by the pinion 18 mating therewith. In this connection, pinion 18 is secured for rotation with the shaft 19, the gripping wheel 20 being provided for hand rotation to accomplish raising and lowing the measuring means. The measuring means is further provided with an abutment plate 21 having a front surface 22. The front surface 22 of the abutment plate 21 provides a surface for making contact with the outer cylindrical surface of the shaft element 24 being studied. In other words, the front surface 22 of the abutment plate 21 functions as a stop mechanism for the outer cylindrical surface of these shaft elements. In order to provide an integral measuring means, an outer sliding plate or frame 26 is provided along the surface of one of the posts 16 arranged in oppositely disposed relationship from the rack and pinion combination. Thus, the measuring means will move upwardly and downwardly relative to the base plate in an integral fashion.

The micrometer generally designated 29 is provided, and is coupled to the abutment plate 21. While other scale means could be utilized, a micrometer is generally preferred. The forwardly extending shaft element 30 of the micrometer 29 passes through the bore 31 formed in the abutment plate 21, and carries at its free end an extensible member such as the disc 32. Disc 32 is provided with a surface 33 which is generally planar, or otherwise geometrically similar to the surface being measured, this surface 33 being arranged in oppositely disposed relationship to the outer surface 22 of the abutment plate 21. The disc member 32 constitutes, in effect, a traveling plate which is provided as a stop means to engage the surface, the position of which is being determined. The rearwardly extending portion 35 of the micrometer 29 carries the scale indicia normally found in conventional micrometers. The barrel or shaft portion 36 of the micrometer 29 is, of course, mounted for rotation about the central shaft portion 37. A low-friction drive member 38 is provided in order to achieve uniform forces acting between the surfaces being measured, as is conventional in micrometers. The scale indicia is provided to reach zero or a datum point when the inner surface 33 of the traveling plate is in contact with the outer surface 22 of the abutment plate 21.

In order to measure the disposition of a keyway arranged in a generally cylindrical shaft, the shaft is positioned so that its surface comes into contact with the outer surface 22 of the abutment plate 21. The traveling plate 33 is moved into position, such as is illustrated in FIGURE 5, so that its surface coincides with the inner surface 40 of keyway slot 41. When the keyway slot 41 has a width equal to $w$, and when the shaft has a radius $r$, a properly positioned keyway will provide a distance $d$ where indicated which is represented by the formula:

$$d = r - \frac{w}{2}$$

As indicated, this instrument is adapted for use both as a set-up and quality control device. It is versatile, rugged and capable of use in a variety of environments.

It will be appreciated that the examples given herein are for purposes of illustration only, and are not to be otherwise construed as a limitation upon the scope of protection to which this invention is otherwise entitled.

We claim:
1. Apparatus for determining the radial and arcuate disposition of a generally planar surface located in radially spaced relationship to a generally cylindrical surface, said aparatus comprising:
   (a) frame means including a base plate having a support column member disposed at right angles thereto,
   (b) measuring means mounted on said support member and adapted for reciprocatory up-and-down motion along said support column and relative to said base plate,
   (c) means secured to said measuring means including an abutment plate with an exposed contacting surface for contacting the cylindrical surface of the member being studied and establishing a datum plane along said apparatus,
   (d) scale means including an extensible member having a traveling plate with an inwardly directed contacting surface portion opposed to said exposed contacting surface, said plate being aranged for reciprocatory motion relative to said abutment plate, and
   (e) means coupled to said scale means for determining the relative spacing between the outer surface of said abutment plate and the surface contacting portion of said traveling plate.

2. The measuring apparatus as defined in claim 1 being particularly characterized in that said support column member is provided with a rack means, and said measuring means is provided with a pinion meshing with said rack member for providing reciprocatory up-and-down motion of said measuring means relative to said base plate.

3. The measuring apparatus as defined in claim 1 being particularly characterized in that said scale means includes a micrometer means coupled therewith for determining the relative spacing between the outer surface of said abutment plate and the surface contacting portion of said traveling plate.

4. The measuring apparatus as defined in claim 1 being particularly characterized in that said traveling plate is a disc having a generally planar inner surface arranged in opposed relationship to the outer surface of said abutment plate.

5. The measuring apparatus as defined in claim 4 being particularly characterized in that said traveling plate is a disc of thin cross-sectional dimensions.

References Cited

UNITED STATES PATENTS 2,412,665  12/1946  Young.
3,129,512   4/1964  Schiler.

FOREIGN PATENTS 565,544  11/1944  Great Britain.
605,692   7/1948  Great Britain.
902,554   1/1954  Germany.

WILLIAM D. MARTIN, JR., Primary Examiner

U.S. Cl. X.R.

33—167, 170